April 24, 1934.  E. P. LE NOIR  1,956,101
PRESSURE REDUCING VALVE
Filed Aug. 12, 1932
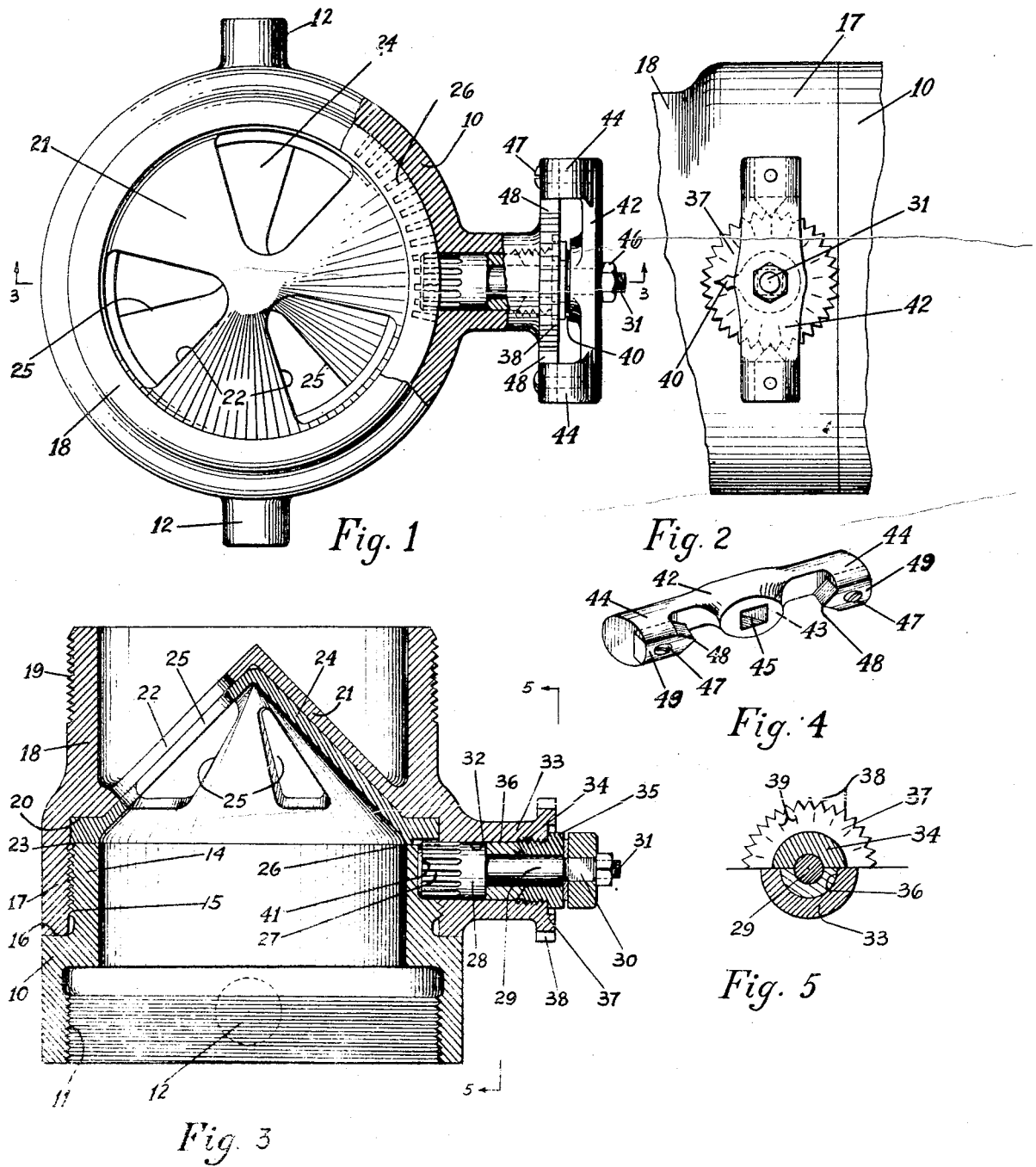
INVENTOR.
Ernest P. Le Noir
BY
Warren E. Willis
ATTORNEY Patented Apr. 24, 1934

1,956,101

UNITED STATES PATENT OFFICE 1,956,101

PRESSURE REDUCING VALVE

Ernest P. Le Noir, Pleasant Plains, N. Y.

Application August 12, 1932, Serial No. 628,498

5 Claims. (Cl. 251—84)

This invention relates to valves and more particularly to types known as pressure reducing valves in which the force of liquid flowing therethrough may be reduced or modified in accordance with requirements.

In buildings of considerable height, where there are a plurality of floors, it is desirable to maintain a fairly uniform, constant pressure for the service demands on each floor, and it is obvious that if no restraint is interposed in the supply system, an undesirably heavy pressure results in the lower floors progressively diminishing in the successive upper floors.

To avoid such conditions some form of pressure reducing valve is connected between the main supply pipe and the several branches leading to the various floors, these valves, after adjustment, being rigidly secured in a manner to prevent their setting from being altered.

Should occasion require that the valves be fully opened, as in case of a fire on certain floors, it is difficult to open them, usually requiring considerable time, during which period considerable damage may occur.

Having these matters in mind, it is an object of the present invention to provide a pressure reducing valve for water and other liquids, designed to resist the internal pressure, its operation being unaffected by it, and which can be accurately adjusted to any desired extent.

A further feature is in the provision of means for locking the valve, when adjusted, in a manner to prevent unauthorized changes from being made in its setting, but which upon the application of a powerful force, will yield to produce a full orificed flow.

These and other advantageous aims, such as a visual index as to its adjustment, the avoidance of leakage, and practical features of manufacture, are accomplished by the novel construction, combination and arrangement of parts hereinafter described and illustrated in the accompanying drawing, constituting a material component of this disclosure, and in which:—

Figure 1 is an end elevational view of a pressure reducing valve made in accordance with the invention, parts being broken away to show the construction.

Figure 2 is a partial side elevational view of the same.

Figure 3 is a longitudinal sectional view taken on line 3—3 of Fig. 1.

Figure 4 is a perspective of the adjusting and locking key in detail.

Figure 5 is a transverse sectional view of the valve actuating mechanism, taken on line 5—5 of Fig. 3.

The body of the valve is of composite construction, consisting of an inlet or base ring 10 having an internal thread 11 suited to engage with standard connections leading from a water main or stand pipe, lugs 12 being provided for a wrench.

An integral annulus 14, of reduced diameter is provided with an external thread 15 and shoulder 16 by which is connected a sleeve 17 drawn tightly against the shoulder by its internal threads.

The outlet 18 of the sleeve is contracted in diameter and provided with a thread 19 to engage a standard fitting, as a hose coupling.

Within the sleeve 17, at the bottom of its thread, is an annular, shouldered seat 20, while on the opposite, outer side of the seat is the base portion of a conical valve seat 21 the angle of which is approximately 90 degrees. The apex of the cone is disposed within the plane of the end of sleeve member 18, and formed in the conical seat 21 are a series of equally spaced openings 22, of substantially triangular outline, three being shown.

Fitting the shoulder seat 20 is a ring 23 held revolubly thereagainst by the inner end of the annulus 14. From this ring extends a conical shell 24 suited to snugly fit the interior of the cone 21 and provided with openings 25 which may be brought into registration with the openings 22 of the cone, moved under its solid portions to act as a complete barrier, or to intermediate positions, constituting an adjustable shutter, as will be readily understood.

Formed in a portion of the underside of the ring 23 are a plurality of radial teeth 26 arranged as a segmental rack, and meshed with the rack teeth is a pinion 27 having a cylindrical shank 28, reduced stem 29, squared, or keyed portion 30 and screw thread 31 at its end.

The shank is revolubly mounted in the bore 32 of a laterally extending radial boss 33 on the sleeve 17, the bore being threaded in its outer portion to receive a packing nut 34 provided with a wrench receiving portion 35 by which a packing ring 36 may be compressed against the shank.

Integral with the end of the boss 33 is a disc 37 having sharply angled teeth 38 cut in its periphery and bearing on its face a dial 39, over which operates an index pointer 40 showing by the graduations on the dial the position of the shutter 24 and thus the setting of the valve.

The inner end of the pinion 27 abuts the bottom of a recess 41 in the annulus 14 and in which it is free to rotate.

A key-bar or handle 42 is formed with a hub 43 on one side, midway between its ends 44, this hub having an opening 45 corresponding to the part 30 of the pinion stem and held in position thereon by a nut 46 threaded on the pinion stem element 31.

The ends 44 of the key-bar are enlarged on the side having the hub 43 and slotted longitudinally to receive detents 49, held by screws 47, the inner, proximate ends 48 of the detents being sharply bevelled to engage the spaces between the teeth 38 of the fixed disc 37.

In operation, the valve having been assembled with its customary pipe connections, the nut 46 is removed and the key-bar applied with its straight side towards the disc 37. Upon turning the key-bar rotary motion is conveyed to the pinion 27 and transmitted by reason of its engagement with the teeth 26 to the ring 23, thus imparting a partial rotary movement to the conical shutter 24, adjusting the operative area of the openings 22 until the desired pressure of liquid passing through the valve is obtained.

Thereafter the key-bar is removed and re-applied in a reversed position, the points of the detents 49 engaging the teeth of the disc 37, thereby locking the pinion from movement in either direction while the key-bar is held in place by the nut.

It remains to be described that the detents 49 are of soft metal with respect to the disc teeth 38, so that by the use of a wrench, in case of necessity, the points will be readily sheared off, permitting the valve to be opened to capacity.

Obviously these detents are replaceable inexpensively and the index 39—40 provides for resetting the valve to its original adjustment without experimentation.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described the invention, what is claimed as new and desired to secure by Letters Patent, is:—

1. A pressure reducing valve comprising a body having two sections forming respectively an inlet and an outlet, a hollow outwardly disposed cone integral with the outlet section, a revoluble ring positioned between said sections at the joint thereof, a conical shutter on said ring seated in said cone, said cone and shutter each having registrable openings, a segmental rack in said ring, a pinion engaging said rack, a fixed disc having peripheral teeth concentric with said pinion, a key-bar to rotate the pinion, and opposed detents on said key-bar to engage the teeth of said disc.

2. A pressure reducing valve comprising a body having two sections constituting respectively inlet and outlet, a hollow outwardly disposed cone integral with the outlet section, a revoluble ring positioned between said sections at the joint thereof, a conical shutter on said ring seated in said cone, said cone and shutter each having registrable openings, a segmental rack in said ring, a hollow boss extending radially from said outlet section, a pinion meshed with said rack, a shank and stem on said pinion housed in said boss, means for packing said shank and stem, a key-bar engageable on said stem to transmit motion to said pinion, detents carried by said key-bar, a toothed disc on said boss engageable by said detents, and means to confine said bar to said stem in either of two positions.

3. A pressure reducing valve comprising a hollow body having means for connections at its inlet and outlet ends, a hollow cone in the outlet end directed outwardly, said cone having a plurality of spaced openings, a conical shutter revoluble against the inner surface of said cone and provided with openings registrable with the openings in the cone, a segmental rack on said shutter, a hollow boss rigid on said body, a pinion meshed with said rack, said pinion having a shank and stem rotatable in said boss, a disc having teeth on its circumference and an index on its face, said disc being fixed on said boss, a key-bar to rotate said stem, and detents on said key-bar to engage the teeth of said disc, said detents being relatively soft and yieldable under the application of force applied to said key-bar.

4. A pressure reducing valve comprising a hollow body having means for connections at its inlet and outlet ends, a pair of hollow cones having a plurality of substantially triangular registrable openings, one of said cones being rigid in said body and the other rotatably mounted in intimate contact with the fixed cone, a hollow boss extending radially from said body, a stem rotatable in said boss, a toothed disc on said boss, means on the inner end of said stem to turn the revoluble cone upon its axis, a handle removably fitted to said stem to cause rotation, means to normally retain said handle in operative engagement on said stem, and a pair of opposed soft yieldable detents replaceably mounted on the ends of said handle to engage the teeth of said disc whereby said cones are retained in adjusted position, said detents being sheared upon the application of force to said handle.

5. In a pressure reducing valve having a body containing a rigid transverse partition and a rotatable shutter, said partition and shutter having registrable openings of an area approximately equal to their solid portions and being substantially triangular in shape, means to rotate said shutter including a stem, a handle removably engaged on said stem, said handle being bar shaped and having inreaching enlargements at its ends, a frangible detent carried by each of the enlargements of said handle, and a disc having peripheral teeth fixed on said body to engage said detents when the valve is in adjustment.

ERNEST P. LE NOIR.